United States Patent [19]

McMahan et al.

[11] Patent Number: 4,524,606

[45] Date of Patent: Jun. 25, 1985

[54] LOW FLOW CALIBRATOR

[76] Inventors: William J. McMahan, 8602 Hickory Hill La., Huntsville, Ala. 35802; John M. Ball, 12032 Chicamauga Trail, Huntsville, Ala. 35803

[21] Appl. No.: 572,785

[22] Filed: Jan. 23, 1984

[51] Int. Cl.³ .......................... G01M 3/26; G01F 25/00
[52] U.S. Cl. ............................................... 73/40; 73/3
[58] Field of Search ........................................ 73/40, 3

[56] References Cited

U.S. PATENT DOCUMENTS

| | | | |
|---|---|---|---|
| 2,936,611 | 5/1960 | Mat et al. | 73/40 |
| 3,100,986 | 8/1963 | Starr et al. | 73/40 |
| 3,245,256 | 4/1966 | Hayward | 73/40 |
| 3,555,909 | 1/1971 | Harrah | 73/732 |
| 4,320,653 | 3/1982 | Bernhardt | 73/40 |

*Primary Examiner*—S. Leon Bashore
*Assistant Examiner*—K. M. Hastings

*Attorney, Agent, or Firm*—Anthony T. Lane; Robert P. Gibson; James T. Deaton

[57] ABSTRACT

A low flow calibrator in which a closed manifold type system is provided that includes a differential pressure transducer with null indication with valving means for opening the system to the atmosphere and for initially nulling the differential pressure transducer and then closing the system, the system includes means for connecting a source with a standard leak therein to the system and the system has an adjustable bellows for varying the volume of the system and for causing the differential pressure transducer to be adjusted to a null position after the system has been closed off by the valve means, and the system has a bourdon tube that can be mechanically adjusted to increase the volume of the system with indicator means being connected relative to the bourdon tube to indicate the amount of volume increase by actuating a closed end of the bourdon tube to enable the system to be used to calibrate the amount of leak from the source.

2 Claims, 1 Drawing Figure

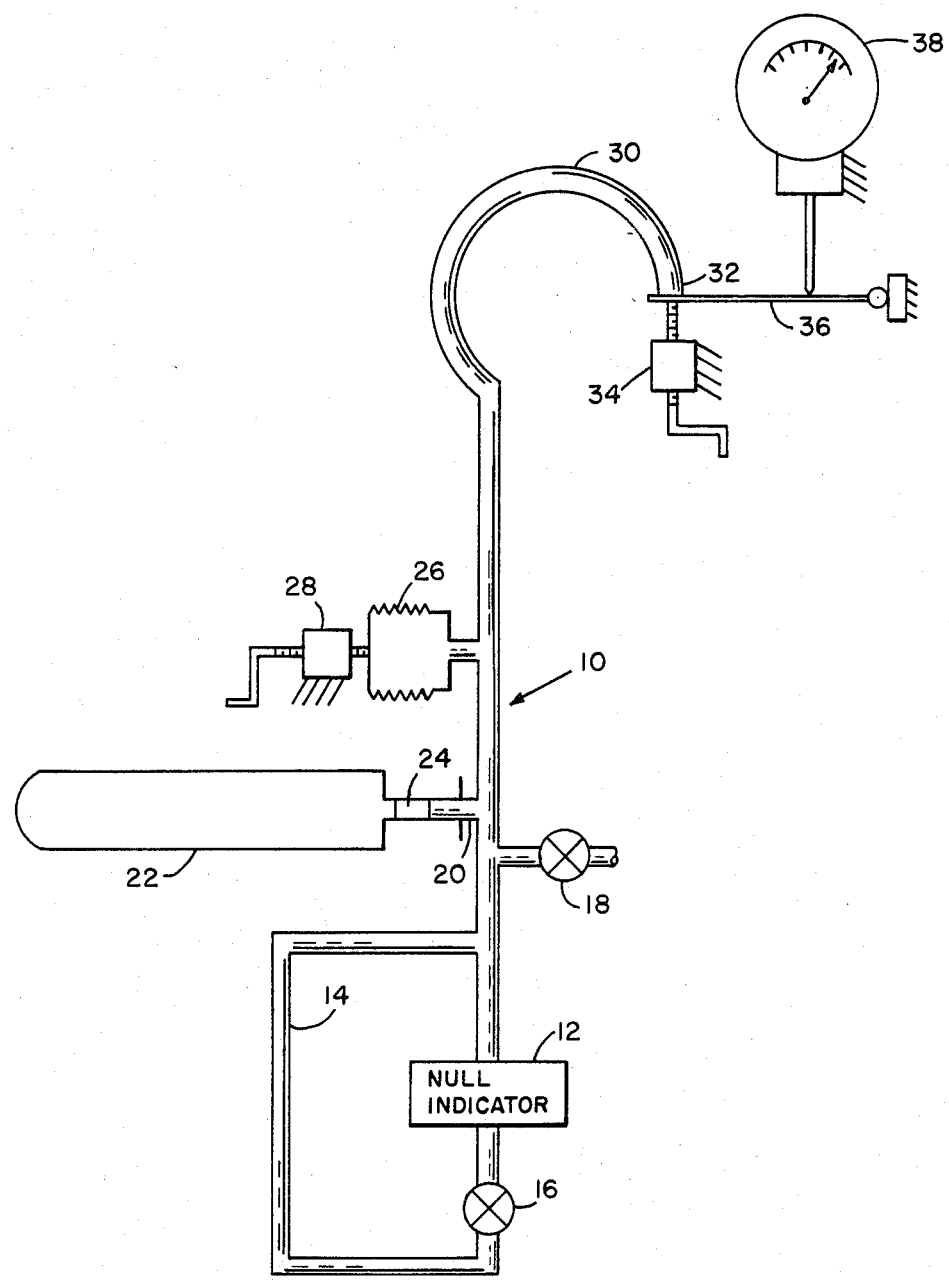

LOW FLOW CALIBRATOR

DEDICATORY CLAUSE

The invention described herein may be manufactured, used, and licensed by or for the Government for governmental purposes without the payment to us of any royalties thereon.

BACKGROUND OF THE INVENTION

A "standard leak" is a calibration standard used to set leak detection equipment. The word "leak" denotes a very low and constant flow rate of gas. Standard leaks may be of several designs, but they generally consist of a pressurized chamber discharging through a capillary or membrane. Rates generally range from $1 \times 10^{-4}$ to $1 \times 10^{-10}$ atmosphere cubic centimeters/second with the rate remaining essentially constant for months or even years at a time.

The standard leak itself must be periodically recalibrated because the degree to which the leak rate decreases with time varies depending upon the conditions of use and storage.

Existing calibration methods and devices for standard leaks include such inaccurate and awkward principles as bubbling in water in which, a $1 \times 10^{-8}$ atmosphere cubic centimeters/second leak produces one bubble in 667 hours or moving a slug of liquid through a tiny capillary tube. More sophisticated systems which use vacuum systems and mass spectrometers or similar hardware are expensive to purchase and difficult to operate. Atmospheric pressure calibrators exist which measure volume displacement with small pistons which are manipulated through seals by the operator. Seals are required to separate the measured volume from fluctuations in barometric pressure. Unfortunately, sliding seals tend to develop leaks as large or larger than the leak rates being measured. Therefore, it can be seen that a more accurate and reliable device for measuring the flow rate produced by standard leaks for the purpose of calibration is needed.

Accordingly, it is an object of this invention to provide a relatively simple closed system device for measuring the flow rate produced by standard leaks for the purpose of calibration.

Another object of this invention is to provide a device which is simple to operate, totally sealed from the atmosphere, and which requires no vacuum system for its operation.

Still another object of this invention is to provide a system which has no seals that are readily subject to leakage due to the seal moving relative to a sealing surface.

Other objects and advantages of this invention will be obvious to those skilled in this art.

SUMMARY OF THE INVENTION

In accordance with this invention, a closed system is provided in which a null meter is connected therein with two-valve means innerconnected to the null meter for initially opening the system to atmospheric pressure on opposite sides of the null meter and then closing of both valves and therefore the closed system. The closed system also includes an adjustable bellows in fluid communication with the system for adjusting the volume of the closed system as needed and the system additionally includes a bourdon tube connected into the closed system at one end and with means for moving the bourdon tube to increase the volume of the closed system, means for indicating movement of the bourdon tube is provided to indicate the increase in volume of the system and therefore the flow rate over a given period of time. The closed system has a standard leak connected therein for which the system is designed to measure and calibrate.

BRIEF DESCRIPTION OF THE DRAWING

The single FIGURE of the drawing illustrates a low flow calibrator in accordance with this invention.

DESCRIPTION OF THE PREFERRED EMBODIMENT

Referring now to the drawing, the low flow calibrator in accordance with this invention includes a closed manifold or tubing type system 10 that has a null indicator or differential pressure transducer 12 connected therein with a bypass passage means 14 connected across opposite sides of null indicator 12 with an on/off valve 16 connected in the bypass passage means. Manifold 10 also has an on/off valve 18 connected into the manifold system for connecting the system to atmosphere when on/off valve 18 is open. System 10 also has an inlet passage connecting means 20 for connection to a bottle source 22 that has a standard leak 24 therein. Closed system 10 also has a bellows 26 connected into the closed system and a crank type adjusting means 28 is connected to bellows 26 in a conventional manner to adjust bellows 26 to increase or decrease the volume of the system by turning the crank of adjusting means 28. Closed system 10 also has a bourdon tube 30 mounted generally at one end of the system. Means are provided for moving closed end 32 of bourdon tube 30 and this is provided by adjustable means 34 such as a crank arrangement or other mechanical moving means that is adjustable and as illustrated this adjustable means pushes through pivoted lever 36 to actuate the end of bourdon tube 30 and thereby increase the volume of the closed system including the volume of bourdon tube 30. The amount of movement of bourdon tube 30 is indicated by precision dial indicator 38.

In operation, bellows 26 and precision indicator 38 are set in the zero or initial position with source 22 connected in the system. Valve 18 is then opened to open the system to atmospheric pressure and valve 16 is also opened to allow opposite sides of null indicator 12 to be balanced out to atmospheric pressure. Valve 18 is then closed to seal off the system and valve 16 is closed to place null indicator 12 into a position for indicating null in accordance with the atmospheric conditions or pressure initially set within the system. If null indicator 12 is no longer in a balanced position after the closing of valve 16, bellows 26 is adjusted by adjustable means 28 to bring null indicator 12 back into a nulled and balanced position. Also, precision indicator 38 should be in the zero position, a time period can then be started and as gas leaks from source 22 through leak 24, the pressure within closed system 10 will tend to increase slightly and in order to maintain this pressure constant, adjustment means 34 is adjusted to pivot lever 36 and move the closed end of bourdon tube 30 to increase the volume within the system by straightening bourdon tube 30 only sufficiently to bring the pressure within the system to a null position again as indicated on null indicator 12. The movement of pivoted arm 36 is indicated on precision indicator 38 which gives an indication of the volume increase of the system. The volume increase over a predetermined length of time is sufficient to indicate the rate of the leak and therefore calibration can occur. To reset the system for taking another reading, mechanical adjusting means 34 is adjusted to the starting position where indicator 38 is in the zero position and bellows 26 is adjusted by adjusting means 28 to bring null indicator 12 to a null position. The volume increase over a predetermined length of time is then measured again so that calibration can occur. This procedure is repeated as many times as desired to calibrate a particular leak or a "standard leak".

Flowrate can be expressed as:

$$q = V\frac{dp}{dt} + P\frac{dv}{dt},$$

where
q = Flowrate
V = Volume of system
P = Pressure in the system
dp/dt = Rate of change in pressure with time
dv/dt = Rate of change in volume with time.

This system adjusts the volume so as to hold the pressure constant, therefore the equation above can be rewritten:

q = p dv/dt.

Measurement of low flowrates (also called leakrates) is reduced to the measurement of volumetric change in bourdon tube 30. Bellows 26 serves only as a zeroing adjustment for initial set-up. Precision dial indicator 38 measures small movements in bourdon tube 30 as adjusted by adjusting means 34.

Notice that bourdon tube 30 is not moving in reaction to the small pressures generated within the system, but rather, tube 30 is moved by adjustment means 34 to generate small changes in volume which are sufficient to maintain a constant pressure within the system.

As an example, if bourdon tube 30 is moved 1.0 cubic centimeter of volume in a time of 60 seconds, while the pressure within the system is held at one atmosphere, then the measured flowrate would be 0.01667 atmosphere cc/second. A flowrate this small would be difficult or impossible to measure by other means.

The purpose of precision dial indicator 38 is to accurately measure the displacement of the end of bourdon tube 30 which is related to volumetric displacement within bourdon tube 30. Movement of tube 30 is used to maintain constant pressure within the system and, therefore, a null indication from the pressure transducer or null indicator 12.

We claim:

1. A low flow calibrator comprising a manifold structure defining a closed system with two ends therein and having an opening connected to a standard leak source, a valve connected into said manifold system for opening said manifold system to atmospheric pressure when desired and for closing and sealing off said system, a differential pressure transducer connected into said manifold system at one end and passage means connecting opposite sides of said differential pressure transducer to the closed system, valve means in said passage means for opening and closing said passage means to allow the same pressures to opposite sides of the differential pressure transducer when desired, adjustable bellows means connected into said closed system for varying the volume of said closed system as desired, a bourdon tube connected into said closed system at the other end, and being movable to vary the volume of said closed system, mechanical adjusting means mounted relative to a closed end of said bourdon tube for moving said closed end of said bourdon tube to increase the volume in said closed system, and a precision dial indicator mounted relative to said mechanical adjusting means for said bourdon tube, means for actuating said dial as said mechanical adjusting means moves said closed end of said bourdon tube, whereas said precision dial indicator indicates the amount of movement of said bourdon tube to enable one to calibrate a standard leak.

2. A low flow calibrator as set forth in claim 1, wherein said mechanical adjusting means and said precision dial indicator are innerconnected through said means for actuating said dial, wherein said means is a pivotable arm so that as said mechanical adjusting means moves said bourdon tube, said precision dial indicator will also be moved by said pivotable arm.

* * * * *